United States Patent
Archer (10) Patent No.: US 10,711,824 B2
(45) Date of Patent: Jul. 14, 2020

(54) LOCKING NUT AND WASHER

(71) Applicant: Kenneth Maxwell Archer, Lesmurdie (AU)

(72) Inventor: Kenneth Maxwell Archer, Lesmurdie (AU)

( * ) Notice: Subject to any disclaimer, the term of this patent is extended or adjusted under 35 U.S.C. 154(b) by 63 days.

(21) Appl. No.: 15/113,451

(22) PCT Filed: Nov. 13, 2014

(86) PCT No.: PCT/AU2014/001042
§ 371 (c)(1),
(2) Date: Jul. 22, 2016

(87) PCT Pub. No.: WO2015/109355
PCT Pub. Date: Jul. 30, 2015

(65) Prior Publication Data
US 2017/0009798 A1    Jan. 12, 2017

(30) Foreign Application Priority Data
Jan. 24, 2014 (AU) ................................ 2014900233

(51) Int. Cl.
*F16B 43/00* (2006.01)
*F16B 39/12* (2006.01)
(Continued)

(52) U.S. Cl.
CPC ............ *F16B 43/001* (2013.01); *B02C 17/22* (2013.01); *F16B 37/044* (2013.01); *F16B 39/12* (2013.01); *B02C 2210/02* (2013.01)

(58) Field of Classification Search
USPC ......................................... 411/533, 119, 120
See application file for complete search history.

(56) References Cited

U.S. PATENT DOCUMENTS 1,384,019 A    7/1921  Johnston et al.
2,258,342 A *  10/1941  Tinnerman ............ F16B 37/041
                                                            411/112
(Continued)

FOREIGN PATENT DOCUMENTS

AU    4878000 A    2/2001
CA    1003669 A    1/1977
(Continued)

OTHER PUBLICATIONS

Search Report of counterpart European Patent Application No. 14879692.3 dated Aug. 30, 2017.
(Continued)

*Primary Examiner* — Gary W Estremsky (57) ABSTRACT

A locking nut (10) and washer (12) for use with a threaded bolt. The locking nut (10) has a tool engaging portion (14), a threaded aperture (20), and a washer engaging portion (18). The washer (12) has a locking nut engaging portion (28, 36) and an aperture (32). When the washer engaging portion (18) engages the locking nut engaging portion (28, 36), the threaded aperture (20) and the aperture (32) align to be at least substantially concentric so as to receive the threaded bolt. In this manner, when the tool engaging portion (14) is appropriately manipulated to force the locking nut (10) in a first direction along the threaded bolt, the engagement between the tool engaging portion (14) and the locking nut engaging portion (28, 36) also causes the washer (12) to move along the threaded bolt in the same direction.

13 Claims, 5 Drawing Sheets

(51) Int. Cl.
  *F16B 37/04*  (2006.01)
  *B02C 17/22*  (2006.01)

(56) References Cited

U.S. PATENT DOCUMENTS

| | | | | |
|---|---|---|---|---|
| 2,409,209 | A * | 10/1946 | Johnson | F16B 37/044 |
| | | | | 411/111 |
| 2,477,429 | A * | 7/1949 | Swanstrom | F16B 37/044 |
| | | | | 411/104 |
| 2,665,730 | A * | 1/1954 | Trumble | F16B 37/044 |
| | | | | 411/166 |
| 2,870,812 | A | 1/1959 | Heller | |
| 3,259,165 | A * | 7/1966 | Tobian | F16B 37/044 |
| | | | | 411/85 |
| 3,259,404 | A * | 7/1966 | Papenguth | F16B 33/004 |
| | | | | 285/212 |
| 3,910,588 | A | 10/1975 | Austin | |
| 4,042,020 | A * | 8/1977 | Wellstein | E21B 33/00 |
| | | | | 166/85.2 |
| 4,654,913 | A | 4/1987 | Grube | |
| 4,979,857 | A | 12/1990 | Wing | |
| 5,244,290 | A * | 9/1993 | Chi | B62K 21/18 |
| | | | | 403/24 |
| 5,380,136 | A * | 1/1995 | Copple | F16B 37/044 |
| | | | | 411/104 |
| 5,468,104 | A * | 11/1995 | Reid | F16B 21/186 |
| | | | | 411/113 |
| 6,811,363 | B1 * | 11/2004 | Minnich | F16B 37/044 |
| | | | | 411/104 |
| 7,059,612 | B2 * | 6/2006 | Kuribayashi | F16B 43/001 |
| | | | | 277/637 |
| 8,177,466 | B2 * | 5/2012 | Csik | F16B 37/043 |
| | | | | 411/174 |
| 8,353,649 | B2 * | 1/2013 | Csik | F16B 37/045 |
| | | | | 411/108 |
| 8,777,538 | B2 | 7/2014 | Strizki et al. | |
| 8,967,932 | B2 * | 3/2015 | Dionne | F16B 39/26 |
| | | | | 411/313 |
| 9,212,682 | B2 | 12/2015 | Yamazaki | |
| 9,574,603 | B2 * | 2/2017 | Verdier | F16B 39/225 |
| 2003/0194294 | A1 | 10/2003 | Wilson | |
| 2008/0022505 | A1 | 1/2008 | Vogel et al. | |
| 2008/0038076 | A1 | 2/2008 | Turner et al. | |
| 2010/0040430 | A1 | 2/2010 | McKinlay | |
| 2011/0123288 | A1 * | 5/2011 | Wallace | F16B 31/028 |
| | | | | 411/13 |

FOREIGN PATENT DOCUMENTS

| | | |
|---|---|---|
| CA | 2832037 A1 | 10/2012 |
| WO | 03102432 A1 | 12/2003 |
| WO | 2010081143 A2 | 7/2010 |
| WO | 2015085444 A1 | 6/2015 |

OTHER PUBLICATIONS

International Search Report of PCT Patent Application No. PCT/AU2014/001042 dated Jan. 27, 2015.

* cited by examiner

LOCKING NUT AND WASHER

FIELD OF THE INVENTION

The invention relates to a locking nut and washer. The locking nut and washer of the present invention is particularly suited to use with grinding mills used in the mining industry.

BACKGROUND TO THE INVENTION

The following discussion of the background to the invention is intended to facilitate an understanding of the present invention. However, it should be appreciated that the discussion is not an acknowledgment or admission that any of the material referred to was published, known or part of the common general knowledge in any jurisdiction as at the priority date of the application.

Nuts and bolts are often used industrially as means of securing articles together (typically large scale equipment). In the case of mining equipment, one such use is as means of securing together a grinding mill.

A grinding mill typically uses a combination of grinding balls and water to mill ore. Due to the high impact nature of the process that takes place inside the grinding mill, the internal surface of the grinding mill is adorned with liner plates. These liner plates are typically installed by way of threaded bolts that penetrate the shell of the grinding mill. To facilitate this arrangement, a plurality of apertures are provided in the shell of the grinding mill.

As the size of the threaded bolt may not be known in advance, these apertures have to be of sufficient size to handle a variety of sized bolts. This leads to a further problem in that water, and other material, can then leak from the mill by way of the potentially large gap that is formed between the aperture and the bolt.

To prevent this leakage, a washer—referred to in the industry as a cup washer—is positioned in between the bolt and the nut. The washer must be of greater size than the aperture so as to seal off any gap that may be formed.

The problem with this arrangement is two fold:

When the mill needs to be disassembled for shutdown or other maintenance related purposes, the nut need first be removed to allow the cup washer to be removed thereafter;

The cup washer incorporates a sealing material (such as an elastomer), which due to the environment in which it is placed, often deforms and fails to seal off the aperture. At the very least this causes difficulties in seeking to remove the cup washer as well as potential leakage from the mill during operation.

The end result of these problems is that significant time (generally in the order of five (5) to six (6) minutes) is spent in seeking to remove a single commonly used cup washer and nut. When considering that a mill may have upwards of three hundred (300) such cup washers and nuts about its surface, this means that any reduction in the time needed to remove a cup washer and nut will have significant productivity advantages.

In an attempt to achieve such advantages, one solution proposed is the cup washer retailed under the trade mark ELINGOL® by Ingenieria Innovaciones Technologicas ("IIT") of Chile and the subject of Chilean patent application 182-2011.

The ELINGOL® cup washer is a substantially toroid shaped article. Protruding from the exterior surface of the toroid is an assembly projection. The assembly projection is designed to mate with a special tool and it is through the actions of this special tool that the ELINGOL® cup washer can be installed or removed as required.

The problems with this approach is as follows:

The nut still needs to be removed separately by means of conventional removal tools. This means that time can be lost where a single operator seeks to remove a cup washer due to the need to change between tools.

The maintenance worker needs to be in possession of the special removal tool. This further increases the costs of the system as a whole—not just in monetary terms, but also in terms of storage costs, safety, etc.

Due to the high torque and speed of the removal tool, if it is not properly mated to the assembly projection and disengagement ensues, there is significant potential for injury to the maintenance worker.

Even if properly mated, if the maintenance worker overruns the removal tool, the washer can completely disengage the bolt. This poses a potentially deadly situation as the washer may be projected by the engaging arm of the removal tool in a random direction.

It is therefore an object of the present invention to create a combination of nut and washer that alleviates, if not completely solves, one or more of the aforementioned problems.

SUMMARY OF THE INVENTION

Throughout this document, unless otherwise indicated to the contrary, the terms "comprising", "consisting of", and the like, are to be construed as non-exhaustive, or in other words, as meaning "including, but not limited to".

In accordance with a first aspect of the present invention there is a locking nut and washer for use with a threaded bolt, where
   the locking nut has a tool engaging portion, a threaded aperture, and a washer engaging portion; and
   the washer has a locking nut engaging portion and an aperture;
where, when the washer engaging portion engages the locking nut engaging portion, the threaded aperture and the aperture align to be at least substantially concentric so as to receive the threaded bolt, and where, when the tool engaging portion is appropriately manipulated to force the locking nut in a first direction along the threaded bolt, the engagement between the tool engaging portion and the locking nut engaging portion also causes the washer to move along the threaded bolt in the same direction.

The washer engaging portion may take the form of a collar and the locking nut engaging portion is a channel of size and dimension that may securely receive the collar.

In one preferred configuration, the channel is of size and dimension to securely receive the collar and a direct tension indication device, the direct tension indication device being positioned in the channel underneath the collar. The direct tension indication device may take the form of a squirter.

The collar and/or direct tension indication device may pass through an opening in the channel in order to be received therein.

The washer may further include a first retaining means, the first retaining means operable to close off the opening when the collar is received within the channel and thereby securely retain the collar within the channel. Additionally, in the above mentioned preferred configuration, the washer may further include a second retaining means, the second retaining means operable to close off the opening when the direct tension indication device is received within the channel and thereby securely retain the direct tension indication device within the channel. In both cases, the first retaining means and/or the second retaining means may take any of the following forms: a clip, a ring, a circlip.

Preferably, the tool engaging portion has an external profile that has a hexagonal cross-sectional profile.

The tool engaging portion may attach to the washer engaging portion by way of a bridge having a concave external profile.

Preferably, the washer is a sealing washer. The washer may incorporate a bonded elastomer, the bonded elastomer acting to seal the washer against a surface. Ideally, the bonded elastomer is a non-stick elastomer.

The bonded elastomer may have rings formed thereon, the rings operating to deform and thereby seal pits or other irregularities in the surface.

A non-stick film may be applied to a sealing surface of the bonded elastomer. the non-stick film is preferably made from polytetrafluoroethylene.

BRIEF DESCRIPTION OF THE DRAWINGS

The invention will now be described, by way of example only, with reference to the accompanying drawings, in which.

PREFERRED EMBODIMENTS OF THE INVENTION

Figure 1:
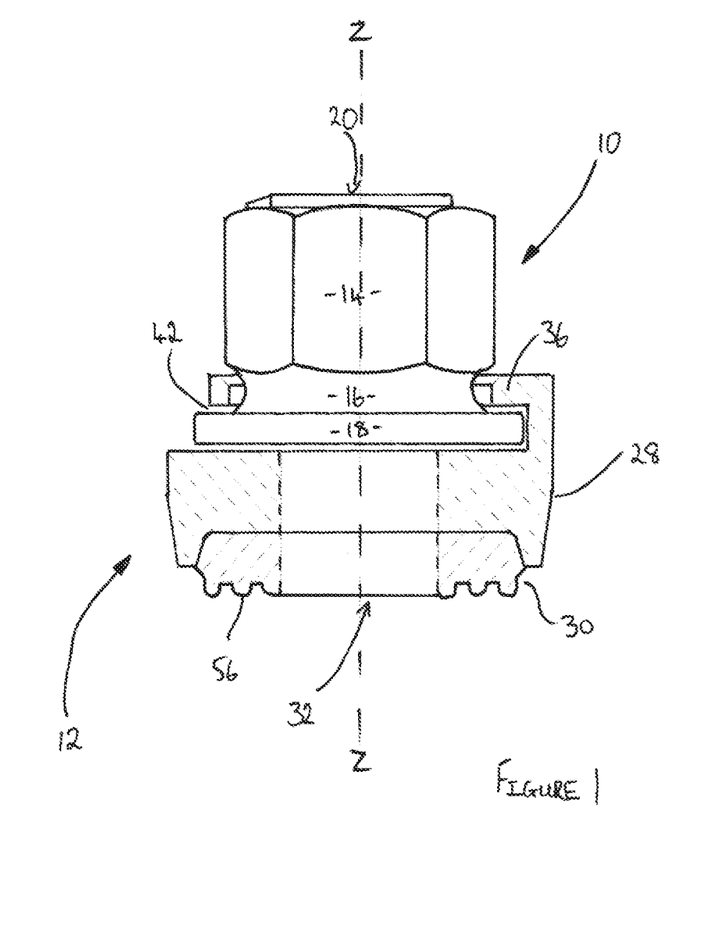
FIG. 1 is a cut-away view of a locking nut and sealing washer of a first embodiment of the present invention in mated configuration.

In accordance with a first embodiment of the invention there is a locking nut 10 and a sealing washer 12. The combination, as assembled, is shown in FIG. 1.

Figure 2:
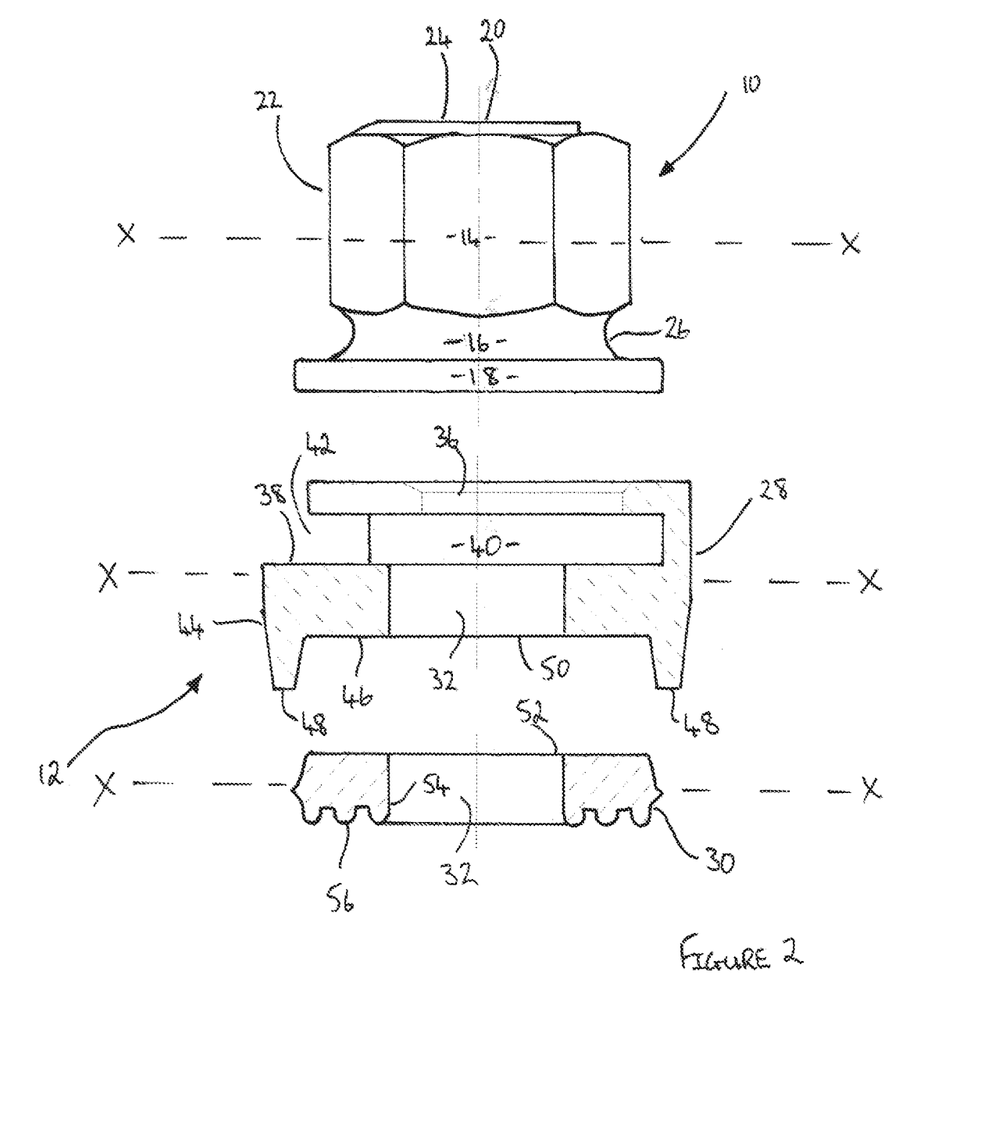
FIG. 2 is an exploded cut-away view of the locking nut and sealing washer of the present invention as shown in FIG. 1.

The locking nut 10 is shown separately in FIG. 2. The locking nut 10 comprises a nut segment 14, a bridge 16 and a collar 18. A threaded aperture 20 extends through each of the nut segment 14, bridge 16 and collar 18.

The aperture 20 and each of the nut segment 14, bridge 16 and collar 18 are concentric about axis Z-Z.

The nut segment 14 has an exterior profile 22 and an interior profile 24. The exterior profile 22 is hexagonal in shape when viewed in cross-section about plane X-X. The interior profile 24 is circular in shape when viewed in cross-section about plane X-X. In this manner the interior profile 24 represents the entrance to aperture 20.

When viewed in cross-section about plane X-X, the bridge 16 is of roughly the same dimension as nut segment 14. However, external side 26 of the bridge 16 is concave. The end result is that the bridge 16 resembles a tyre rim in shape.

The collar 18 is circular in shape when viewed in cross-section about plane X-X. However, in comparison to the same cross-sectional view of the nut segment 14 and bridge 16, the collar 18 is of larger diameter.

Figure 3:
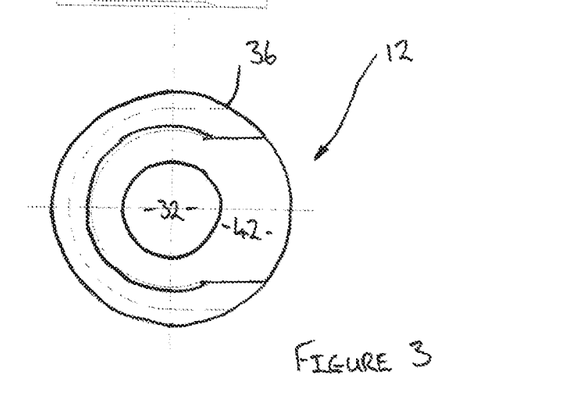
FIG. 3 is a top-down plan view of the sealing washer as shown in FIG. 1.

The sealing washer 12 is comprised of a washer body 28 and an elastomer 30. An aperture 32 also extends through each of the washer body 28 and the elastomer 30. The aperture 32 and each of the washer body 28 and elastomer 30 are concentric about axis Z-Z.

The sealing washer 12 is circular in shape when viewed in cross-section about plane X-X. When compared to the same cross-sectional view of the collar 18, the sealing washer 12 is substantially greater in diameter.

The washer body 28 has a flange 36 extending away from a first side 38. The flange 36 extends from the washer body 28 at its periphery. In this manner, the flange 36 defines an internal channel 40 that extends around the periphery excepting opening 42.

The size of the opening 42 is such that the collar 18 can pass therethrough and be retained within the channel 40.

Protruding from the outer edge 44 of a second side 46 of the washer body 28 is a retaining wall 48. The retaining wall 48 bounds a base surface 50.

The elastomer 30 is bonded to the base surface 50 on a first side 52. The elastomer 30 is also of size such that it is also abuts, and is constrained by, the retaining wall 48. In addition to abutting the retaining wall 48, the elastomer 30 is also bonded thereto.

A second side 54 of the elastomer 30 is formed from a plurality of rings 56. The role of the rings 56 are described in more detail below.

The elastomer 30 in this embodiment is a non-stick elastomer.

This first embodiment will now be described in the context of its intended use.

The repairer (not shown) inserts the collar 18 through the opening 42 until such time as it is retained within the channel 40. When so received, the collar 18 is prevented from moving in any direction by the flange 36 other than in the direction of the opening 42. This also results in threaded aperture 20 and aperture 32 being arranged in a substantially concentric arrangement about axis Z-Z.

Furthermore, in this arrangement, the flange 36 encircles the bridge 16. The concave shape of the bridge thereby acts as a further potential means of preventing movement of the direction along the axis Z-Z.

Of particular importance, in this configuration, any force applied to the locking nut 10 in either direction along axis Z-Z will also force the sealing washer 12 in the same direction.

The repairer then locates a threaded bolt (not shown) on the external surface of a mill (not shown). Once located, the connected locking nut 10 and sealing washer 12 is placed over the threaded bolt.

A standard pneumatic tool (not shown), fitted with an appropriate hexagonal nut removal adaptor (also not shown), both of which would be readily known to the person skilled in the art, is then used to secure the connected locking nut 10 and sealing washer 12 to the external surface.

In securing the connected locking nut 10 and sealing washer 12 to the external surface, the rings 56 of the elastomer 30 deform to take up the space inbetween. The rings 56 also deform to fill any pits or other irregularities in the external surface. In doing so, the aperture through which the bolt passes to engage the locking nut 10 is appropriately sealed.

To remove the connected locking nut 10 and sealing washer 12 from the external surface, the aforementioned standard pneumatic tool is placed so that the adaptor mates with the hexagonal profile of the nut segment 14. Torque is then applied to the nut segment 14 in the appropriate direction to disengage the threads of the threaded aperture 20 from the threads of the bolt.

As the threads of the threaded aperture 20 disengage the threads of the bolt, this also acts as a directional force along the Z-Z axis. This forces the collar 18 to engage the flange 36. As this force continues, this engagement also draws the sealing washer 12 away from the external surface.

It is to be noted here that the engagement between the collar 18 and flange 36 is not rotational in nature. This means that the sealing washer 12 is not imparted with rotational movement when torque is applied to the nut segment 14.

As importantly, this means that the torque of the standard pneumatic tool facilitates not only removal of the locking nut 10, but also of the sealing washer 12. It also means that only in circumstances where the elastomer 30 has created a bond with the external surface of greater strength than the torque applied by the pneumatic tool that further action may need to be taken by the repairer to remove any excess bond (it being unlikely that the sealing washer 12 will not have been at least partially removed by the pneumatic tool due to the non-stick nature of the elastomer 30 and the high level of torque applied by the pneumatic tool).

It should also be noted here that even if the repairer operates the pneumatic tool for a period that sees the combined locking nut 10 and sealing washer 12 completely disengage the bolt, the combined elements will remain engaged to the pneumatic tool, but with only the locking nut 10 rotating within the sealing washer 12. Thus, the safety concerns of the ELINGOL® cup washer system are essentially eliminated.

Figure 4:
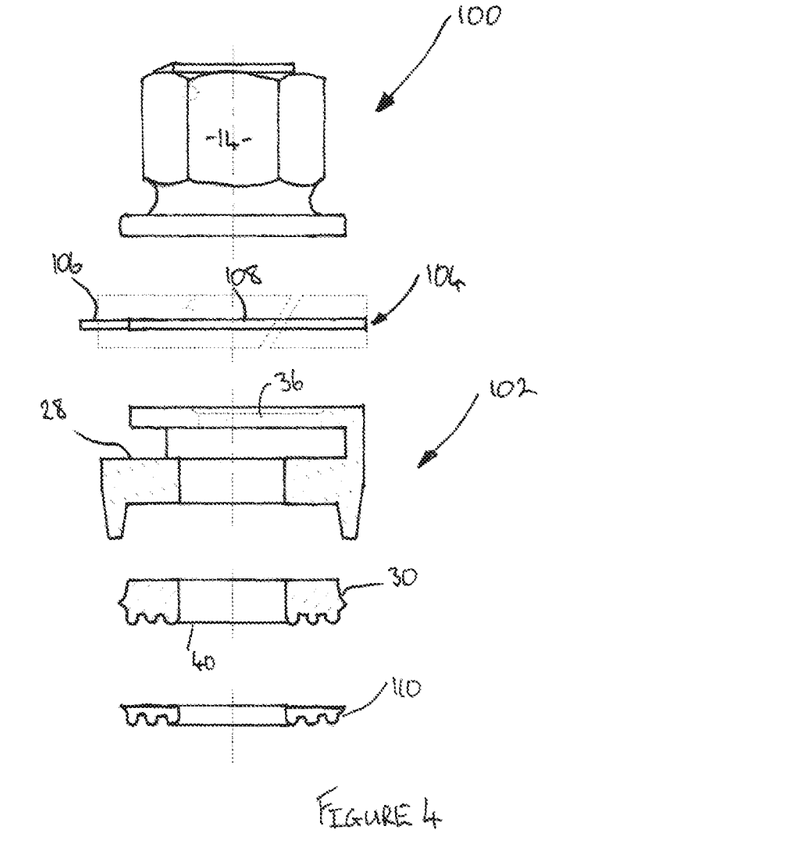
FIG. 4 is an exploded cut-away view of the locking nut and sealing washer of a second embodiment of the present invention.

In accordance with a second embodiment of the invention, where like numerals reference like parts, there is a locking nut 100 and sealing washer 102. This embodiment of the invention is shown in FIG. 4.

The locking nut 100 is identical in construction to the locking nut 10 of the first embodiment, but with the addition of retaining clip 104. Similarly, the sealing washer 102 is the same as that of the first embodiment, but with the addition of a non-stick film 110.

The retaining clip 104 comprises two arms 106 and a loop section 108. The loop section 108 is of roughly the same size as flange 36.

In this embodiment, the non-stick film 110 is applied over the second side 40 of the elastomer 30. This includes the rings 42. The non-stick film 110 here is made from a polytetrafluoroethylene.

The second embodiment will now be described in the context of its intended use.

The retaining clip 104 is attached to the sealing washer 102 such that the loop section 108 surrounds the flange 36. Due to the similarities in size between the flange 36 and the loop section 108, the retaining clip 104 stretches slightly and thereby creates a secure connection with the flange 36.

With the retaining clip 104 securely connected, the arms 106 are manipulated so that they are positioned either side of the opening 42. The sealing washer 12 can then be connected to the locking nut 100 in a manner identical to that described in the first embodiment of the invention, i.e. without rotational engagement between the locking nut 10 and sealing washer 12.

Once connected as per the first embodiment of the invention, the repairer manipulates the arms 106 once again until such time as the loop section 108 covers the opening 42.

Removal of the connected locking nut 100 and sealing washer 102 proceeds as described in respect of the first embodiment. However, due to the presence of the non-stick film 110 in this embodiment, there is even less chance that the sealing washer 102 cannot be removed—and removed cleanly—by the repairer.

It is to be noted in the case of the first embodiment, there is a remote chance that the locking nut 10 may disconnect from the sealing washer 12 by way of the opening 42 during removal. To eliminate this problem, in this second embodiment, the sealing washer 102 is now specifically prevented from moving in any direction—either by the flange 36 as described above or the retaining clip 104 in the case of movement towards the opening 42.

Once the connected locking nut 100 and sealing washer 102 have been removed, to disassemble the two items, the arms 106 are again manipulated so that they are positioned either side of the opening 42. The sealing washer 102 can then be removed with ease.

Figure 5A:
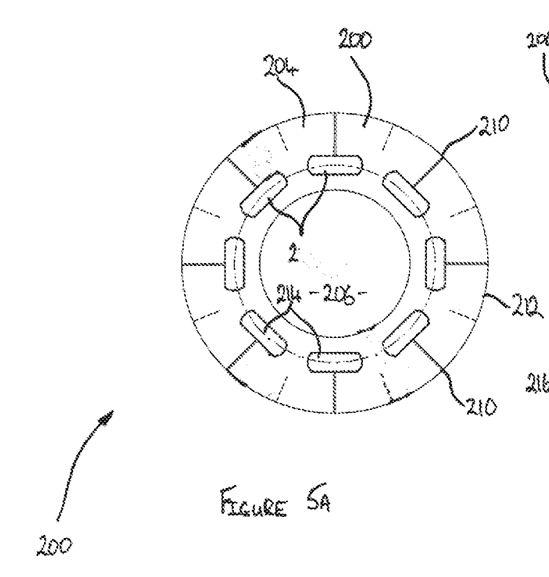
FIG. 5*a* is a front plan view of a direct tension indication device as used in a third embodiment of the present invention.
Figure 5B:
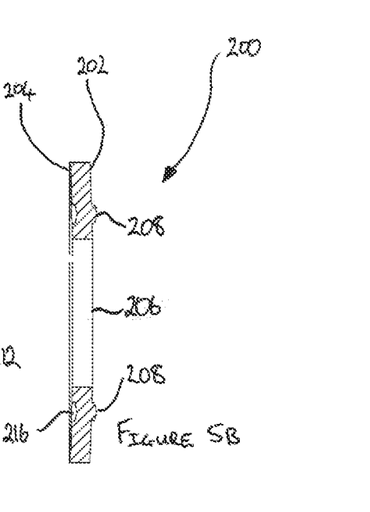
FIG. 5*b* is a side plan view of the direct tension indication device as shown in FIG. 5*a*.

In accordance with a third embodiment of the invention, where like numerals reference like parts, there is a variation of the first embodiment in which the opening 42 and internal channel 40 are both of enlarged height. The enlarged height allows the insertion not only of the locking nut 10 but also allows the insertion of a direct tension indication device 200 as shown in FIGS. 5a and 5b. The direct tension indication device 200 is also known in the industry as a squirter and will thus be referred as such for the remainder of the description.

The squirter 200 has a first side 202 and a second side 204. The first side 202 has a convex surface tending towards an aperture 206. Equidistantly spaced around the circumference of the aperture 206 are a plurality of dimples 208.

The second side 204 has a slight conical surface. Spaced equidistantly around the second side 204 are a plurality of fluid channels 210. Each fluid channel 210 extends from the external periphery 212 of the squirter 200 to a dipped recess 214. Positioned in the dipped recess 214 is a blister pack 216. The blister pack 216 contains a high visibility soft polymer (not shown). Each blister pack 216 is located on the second side 204 in an exact opposite position to the location of the dimple 208 on the first side 202.

This embodiment will now be described in the context of its intended use.

Figure 6:
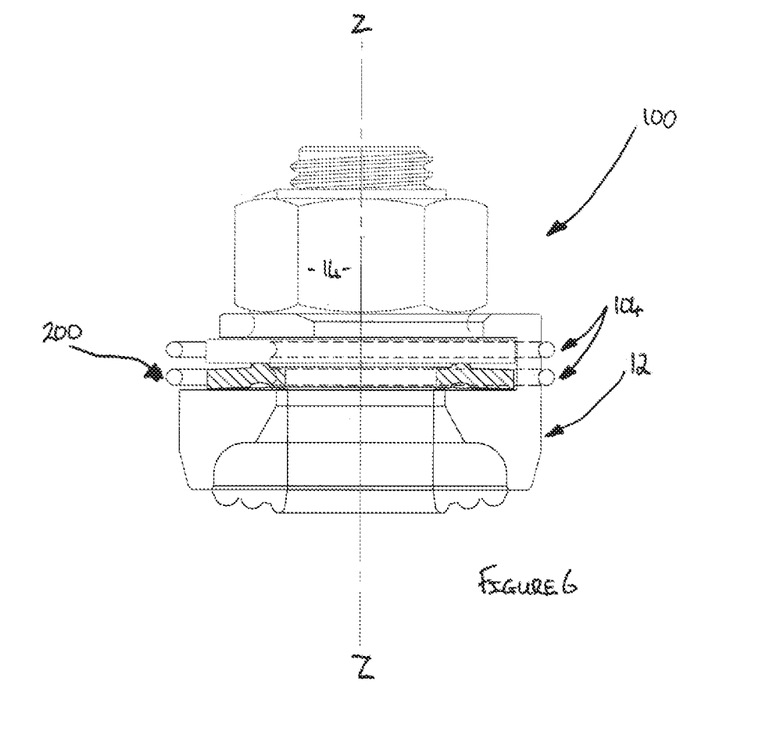
FIG. 6 is a side cut-away view of a locking nut and sealing washer of the third embodiment of the present invention.

The repairer (not shown) inserts the squirter 200 through the opening 42 until such time as it is retained within the channel 40. Once so retained, the repairer then inserts the collar 18 through the opening 42 and into the channel 40. When properly configured, this sees the collar 18 positioned on top of the squirter 200.

It should be noted that unlike the use of squirters in other applications, there is no need for the squirter 200 to be installed in a particular orientation as part of this embodiment of the invention. The invention will continue to work as planned regardless of whether the first side 202 or the second side 204 makes contact with the collar 18.

The installation and configuration of the locking nut 10 and sealing washer 12 thereafter continues as described in the first embodiment of the invention, with the following exception.

As torque is applied to the locking nut 10, the squirter 200 becomes sandwiched between the locking nut 10 and the washer body 28. The resulting application of force to the first side 202 causes the concave surface to flatten out. This also causes the dimples 208 to flatten, with the result that a further pressure is applied through the body of the squirter 200 to the blister pack 216.

Application of force to the blister pack 216 through the body of the squirter 200, as well as direct from the washer body 28 results in the blister pack 216 bursting when a predetermined level of tension has been reached. Bursting of the blister pack 216 allows the high visibility soft polymer to escape and travel along the fluid channels 214 at a velocity.

The repairer looks for the soft polymer's escape from the fluid channels 214 during the process of applying torque to the locking nut 10 so as to ensure that the locking nut 10 has been sufficiently tensioned. This also acts as a flag to the repairer to stop applying torque to the locking nut 10 so as to prevent over-tensioning of same.

It is to be specifically noted in this embodiment that the presence of the squirter 200 between the locking nut 10 and sealing washer 12 further shows that there is no rotational engagement between these two components.

It should be appreciated by the person skilled in the art that the above invention is not limited to the embodiments described. In particular, the following modifications and improvements may be made without departing from the scope of the present invention:

While the invention has been described in the context of an alternative to the nut and cup washer arrangements for grinding mills, its use can be applied to any domestic or industrial system where the simultaneous removal of a washer and nut from a bolt is desired.

The exterior profile 22 of the locking nut 10, 100 may be of a shape other than hexagonal. For instance, the exterior profile 22 may be square.

Similarly, the shape of the collar 18 and flange 36 may be changed from the circular shape described. For instance, the flange 36 may be square shaped with a similarly shaped collar 18 to facilitate mating to the square flange 36.

Rings 56 may be omitted or modified.

The elastomer 30 need not be non-stick.

The retaining clip 104 may be omitted in favour of a retaining ring. The retaining ring may be secured to the collar 18 by way of a tongue and groove configuration. The retaining ring may thereby be rotated to cover off the opening 42 by moving the tongue along the path of the groove.

Similarly, the retaining clip 104 may be omitted in favour of a circlip received within a groove. The circlip can then be arranged such that the lugs sit adjacent the opening 42. The collar 18 may then be secured in place within the channel 40 by way of a further bolt that threadedly engages both lugs.

The third embodiment of the invention may be modified to incorporate the retaining clip 104 of the second embodiment, or the aforementioned retaining ring or circlip, with the retaining clip 104 (or equivalent) being modified so as to further assist in the retention of the squirter 200. This can be achieved by increasing the relative size of the retaining clip 104 (or its equivalent). Alternatively, a second retaining clip 104 (or equivalent) may be used to secure the squirter 200 in place independent of the retaining clip 104 (or equivalent) used to secure the locking nut 10 in place as is shown in FIG. 6.

While the third embodiment has been described in the context of a squirter other direct tension indication devices may be modified to suit the invention as described in the third embodiment. As such, any such direct tension indication device used in such a manner is considered within the scope of the present invention.

The means of connection between locking nut 10, 100 and sealing washer 12, 102 may take other forms than that described above. However, it is important that the connection allows for the sealing washer 12, 102 to be securely retained or removed through appropriate manipulation of the locking nut 10, 100.

It should be further appreciated by the person skilled in the art that the invention is not limited to the embodiments described above. Additions or modifications described, where not mutually exclusive, can be combined to form yet further embodiments that are considered to be within the scope of the present invention.

I claim:

1. A locking nut and washer for use with a threaded bolt, where the locking nut has a tool engaging portion, a threaded aperture, and a washer engaging portion in the form of a collar; and the washer has a locking nut engaging portion in the form of a channel of size and dimension that may securely receive the collar and an aperture, the locking nut engaging portion further having a bonded elastomer attached thereto, the bonded elastomer acting to seal the washer against a surface;

where, the collar passes through an opening in the channel in order to be received therein, the opening in the channel being able to be closed off by a first retaining means and thereby securely retain the collar within the channel, and where, when so securely retained, the threaded aperture and the aperture align to be at least substantially concentric so as to receive the threaded bolt, and where, when torque is applied to the tool engaging portion, an axial force is applied by the collar to a portion of the channel, the axial force thereby causing the washer to move along the threaded bolt in the same direction as the locking nut, the washer capable of disengagement from the locking nut when not in receipt of the threaded bolt.

2. A locking nut and washer according to claim 1, where the first retaining means is one of the following: a clip, a ring, a circlip.

3. A locking nut and washer according to claim 1, where the tool engaging portion is attached to the washer engaging portion by way of a bridge having a concave external profile.

4. A locking nut and washer according to claim 1, where the bonded elastomer is a non-stick elastomer.

5. A locking nut and washer according to claim 1, where the bonded elastomer has rings formed thereon, the rings operating to deform and thereby seal pits or other irregularities in the surface.

6. A locking nut and washer according to claim 1, further including a non-stick film applied to a sealing surface of the bonded elastomer.

7. A locking nut and washer according to claim 6, where the non-stick film is made from polytetrafluoroethylene.

8. A fastening system for a threaded bolt comprising:

a locking nut having a tool engaging portion, a threaded aperture, and a washer engaging portion;

a washer having a locking nut engaging portion and an aperture; and a direct tension indication device, where, the locking nut engaging portion is a channel of size and dimension to securely receive the washer engaging portion and thereunder the direct tension indication device and where, when the washer engaging portion engages the locking nut engaging portion, the threaded aperture and the aperture align to be at least substantially concentric so as to receive the threaded bolt, and where, when torque is applied to the tool engaging portion an axial force is applied by the washer engaging portion to the locking nut engaging portion, the axial force thereby causing the washer to move along the threaded bolt in the same direction as the locking nut, the washer capable of disengagement from the locking nut when not in receipt of the threaded bolt.

9. A fastening system for a threaded bolt according to claim 8, where the direct tension indication device is a squirter.

10. A fastening system according to claim 8, where the direct tension indication device passes through an opening in the channel in order to be received therein.

11. A fastening system according to claim 10, where the washer further includes a second retaining means operable to close off the opening when the direct tension indication device is received within the channel and thereby securely retain the direct tension indication device within the channel.

12. A fastening system according to claim 11, where the second retaining means is one of the following: a clip, a ring, a circlip.

13. A fastening system according to claim 8, where the washer incorporates a bonded elastomer, the bonded elastomer acting to seal the washer against a surface.

* * * * *